United States Patent
Knirsch

(10) Patent No.: US 8,464,983 B2
(45) Date of Patent: Jun. 18, 2013

(54) TOWING APPARATUS FOR A SPACECRAFT WHEN IN ORBIT AND A TOWING SPACECRAFT

(75) Inventor: Ulrich Knirsch, Markdorf (DE)

(73) Assignee: Astrium GmbH, Taufkirchen (DE)

( * ) Notice: Subject to any disclaimer, the term of this patent is extended or adjusted under 35 U.S.C. 154(b) by 144 days.

(21) Appl. No.: 13/023,566

(22) Filed: Feb. 9, 2011

(65) Prior Publication Data

US 2011/0192936 A1   Aug. 11, 2011

(30) Foreign Application Priority Data

Feb. 10, 2010   (DE) .................... 10 2010 007 699

(51) Int. Cl.
*B64G 1/64*   (2006.01)
(52) U.S. Cl.
USPC ................... 244/158.2; 244/172.4
(58) Field of Classification Search
USPC ............ 244/158.2, 158.4–158.8, 164, 172.1, 244/172.4–172.6, 173.3
See application file for complete search history.

(56) References Cited

U.S. PATENT DOCUMENTS

| 3,201,065 A | 8/1965 | Dunn |
| 6,017,000 A | 1/2000 | Scott |
| 6,523,783 B2 * | 2/2003 | Lounge et al. ............. 244/172.4 |
| 6,942,186 B1 | 9/2005 | Levin et al. |
| 7,207,525 B2 | 4/2007 | Bischof et al. |
| 8,052,092 B2 * | 11/2011 | Atmur et al. ................ 244/158.2 |
| 2002/0079407 A1 | 6/2002 | Lounge et al. |
| 2004/0245405 A1 * | 12/2004 | Tchoryk et al. .............. 244/163 |
| 2005/0103940 A1 * | 5/2005 | Bischof et al. ............... 244/161 |

FOREIGN PATENT DOCUMENTS

| DE | 198 46 327 C1 | 3/2000 |
| DE | 103 42 953 A1 | 4/2005 |
| EP | 1 516 815 A1 | 3/2005 |
| WO | WO 90/01447 A1 | 2/1990 |

* cited by examiner

*Primary Examiner* — Timothy D Collins
*Assistant Examiner* — Brian M O'Hara
(74) *Attorney, Agent, or Firm* — Crowell & Moring LLP

(57) ABSTRACT

A towing apparatus for a spacecraft when in orbit is provided. The towing apparatus includes a cable, the first end of which is intended to be permanently connected to a spacecraft that must potentially be towed, and the second end of which is provided to be at least temporarily connected to a towing spacecraft for the purpose of towing. An attachment piece is disposed on the second end of the cable for mechanical attachment to a complementary attachment piece of the towing spacecraft, and a positioning aid is disposed to allow for simplified detection of the attachment piece by the towing spacecraft.

16 Claims, 1 Drawing Sheet

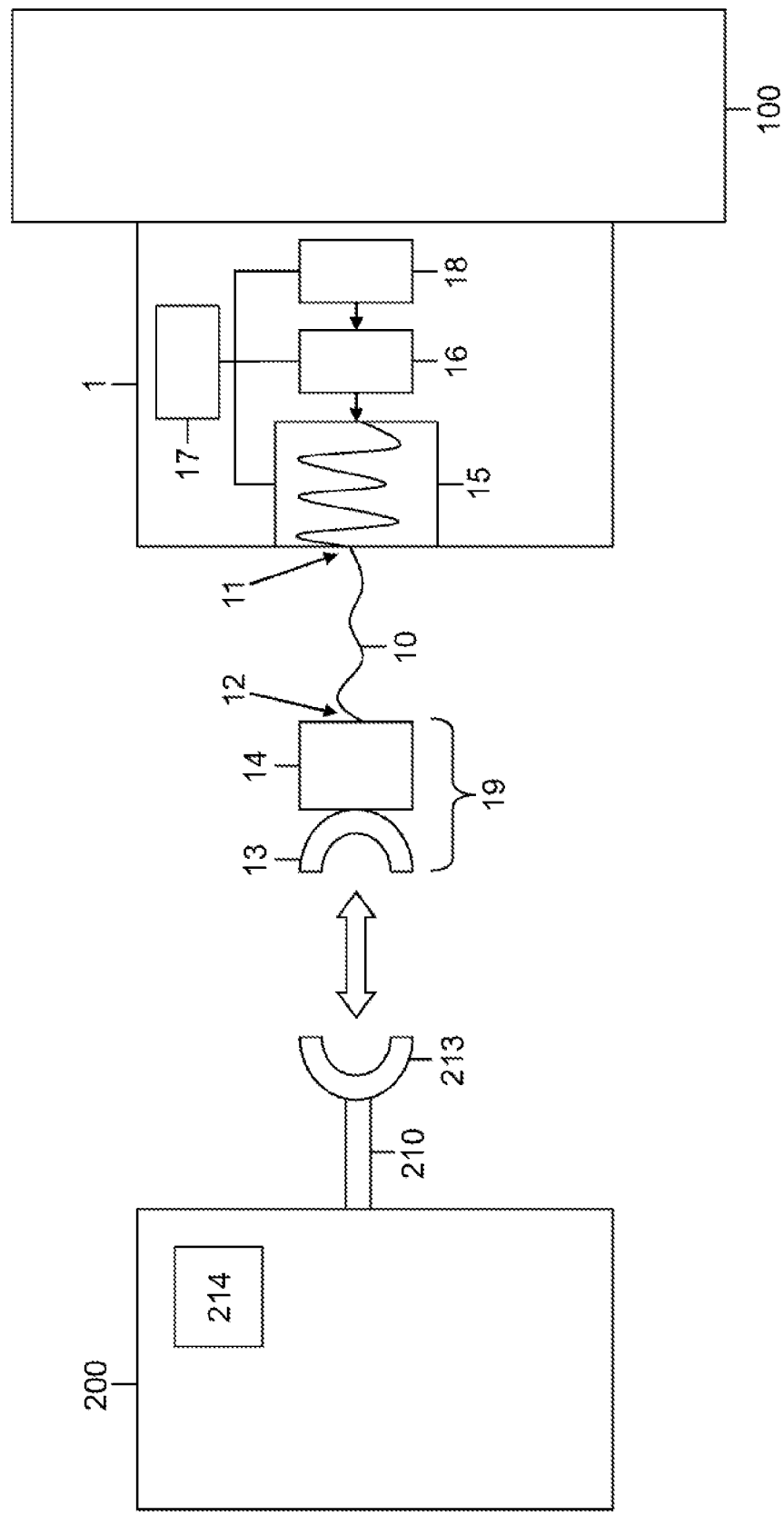

TOWING APPARATUS FOR A SPACECRAFT WHEN IN ORBIT AND A TOWING SPACECRAFT

CROSS REFERENCE TO RELATED APPLICATIONS

This application claims priority under 35 U.S.C. §119 to German Patent Application No. 10 2010 007 699.6-22, filed Feb. 10, 2010, the entire disclosure of which is herein expressly incorporated by reference.

BACKGROUND AND SUMMARY OF THE INVENTION

The invention relates to a towing apparatus for a spacecraft when in orbit. The invention furthermore relates to a spacecraft, in particular, a satellite, as well as a towing spacecraft.

The debris created through the ongoing and increasing exploitation of space endangers spacecraft such as, e.g., satellite and manned space vehicles. Generally speaking, spacecraft are supposed to "dispose" of themselves in a controlled fashion before the end of their useful life. However, whenever a malfunction occurs during the lifetime of a spacecraft, conditions may arise whereby disposal of the spacecraft by itself is no longer ensured.

For this reason, certain consideration has been devoted to having defective spacecraft disposed of by special spacecraft, what are called towing spacecraft. To this end, the towing spacecraft must move into the immediate vicinity of a defective spacecraft, e.g., a satellite, and once there dock with a rocket motor or the like. This type of docking maneuver is fraught with difficulties, however, since defective spacecraft are often tumbling. Nevertheless, colliding with the defective spacecraft must be avoided at all costs since then the towing spacecraft itself could suffer damage.

Exemplary embodiments of the present invention provide a towing apparatus that enables a defective spacecraft to be towed simply and more safely. In addition, exemplary embodiments of the present invention provide a spacecraft and a towing spacecraft that enable a defective spacecraft to be towed and disposed of simply and safely.

In accordance with one aspect of the invention a towing apparatus for a spacecraft that may be potentially towed when in orbit is provided. The towing apparatus comprises a cable, the first end of which is permanently connected to the spacecraft, and the second end of which is at least temporarily connectable to a towing spacecraft for the purpose of towing; an attachment piece disposed on the second end of the cable, the attachment piece is mechanically attachable to a complementary attachment piece of the towing spacecraft; and a positioning aid disposed on the cable to allow for detection of the attachment piece by the towing spacecraft. Exemplary embodiments also involve a spacecraft with the towing apparatus. Exemplary embodiments further involve a towing spacecraft comprising an attachment piece mechanically connectable to a complementary attachment piece of a towing apparatus of another spacecraft, the towing apparatus of the another spacecraft including a cable with first and second ends, the complementary attachment piece being disposed on the second end of a cable.

The invention provides a towing apparatus for a spacecraft when in orbit. The towing apparatus comprises a cable, the first end of which is intended to be permanently connected to a spacecraft that must potentially be towed, and the second end of which is provided to be at least temporarily connected to a towing spacecraft for the purpose of towing, wherein an attachment piece is disposed on the second end of the cable for mechanical attachment to a complementary attachment piece of the towing spacecraft, and a positioning aid is disposed to allow for simplified detection of the attachment piece by the towing spacecraft.

The spacecraft and the towing spacecraft are, for example, satellites. However, these can also be manned spacecraft.

The towing apparatus is preferably installed as a preventive measure on every spacecraft to be launched in the future so as to enable this to be towed by the towing apparatus in the event of a malfunction.

The cable provided by the towing apparatus according to the invention allows the towing spacecraft to "dock" with a spacecraft to be towed at a sufficient distance so as to minimize the risk of collision between the spacecraft to be towed and the towing spacecraft. The towing apparatus according to the invention can be installed in a space-saving manner on the spacecraft to be equipped with this apparatus. The action of towing a defective spacecraft furthermore has the fundamental advantage in that any collisions generated by subsequent space debris can be avoided. Provision of the positioning aid on the free end of the cable of the towing apparatus enables the free end to be more easily located by the towing spacecraft. This enables the attachment of the two attachment pieces to be simplified and accelerated.

A mass is preferably disposed on the second end of the cable in such a way as to reduce the tumbling motion of the cable and/or of the spacecraft to be towed. With a spacecraft to be towed, it must typically be assumed that this will undergo a tumbling motion that fundamentally impedes the process of docking to a towing spacecraft. The mass is thus provided on the free end of the cable by which attachment of the towing spacecraft is to be effected in order to increase the moment of inertia of the spacecraft to be towed and retard any tumbling motion. As a result, attachment process is simplified for attachment of the attachment piece to the second end of the cable of the towing apparatus and of the complementary attachment piece of the towing spacecraft. It is especially advantageous for the mass to be provided by the attachment piece and/or the positioning aid itself, since this approach does not require any additional components.

It is advantageous for the cable to be of a length from 5 to 25 m, in particular, from 8 to 12 m, most preferably 10 m, so as to prevent the spacecraft to be towed and the towing spacecraft from colliding during the towing process.

In another embodiment, the attachment piece is in the form of a standardized adapter. This enables spacecraft of varying manufacture to be towed by a towing spacecraft.

In order to facilitate the detection and capture by the towing spacecraft of the free second end of the cable, provision is furthermore made whereby the positioning aid comprises a reflector and/or a permanent magnet. The reflector can be designed to effect optical detection or detection by RF (radio frequency). The reflector and/or the permanent magnet can be disposed on or in the attachment piece of the cable. It is equally possible to provide the attachment piece itself in a form that is reflective and/or magnetic. This can facilitate creating the contact between attachment piece and complementary attachment piece of the towing spacecraft. In addition to creating the connection between attachment piece and complementary attachment piece, provision can furthermore be made whereby another, e.g. releasable locking mechanism is provided that provides a reliable mechanical connection between the two components up to a given force level.

In another advantageous embodiment, the apparatus has a cable receiver that receives the cable in a space-saving manner, and then extends the cable after receiving an actuation signal to attach to the complementary attachment piece in order to enable the spacecraft to be towed. This means that the first end of the cable is mechanically connected through the cable receiver to the spacecraft that must potentially be towed. The cable receiver ensures that the cable is stored in it until the time when a malfunction occurs in the spacecraft. The cable is released by the cable receiver only after the actuation signal is received, with the result that the cable moves away from the defective spacecraft and can be gripped by the towing spacecraft for the purpose of towing and disposal.

To this end, the cable receiver is advantageously connected to a release device that controls the action of extending the cable. In one variant, this device can be operated electrically. Provision is furthermore made whereby the release device has an independent power supply that can implement the action of releasing and thus extending the cable from the cable receiver so as to ensure that the release device functions even in the event of an electrical malfunction in the spacecraft. Alternatively or additionally, it is also possible to operate the release device mechanically. To this end, this mechanism can comprise, by way of example, a spring-loaded mechanism that allows the cable to be extended by the force of a spring once the independent power supply has failed, for example. The release device can preferably be operated both electrically as well as mechanically so as to provide redundancy (i.e., as a fail-safe) for extending the cable.

In addition, the towing apparatus comprises a detection means connected to the release device, the detection means being designed to detect the approach of a towing spacecraft, and in particular, to supply the actuation signal to the release device whenever a certain relative distance has fallen below a specified value, thereby initiating extension of the cable. To this end, the detection means and the towing spacecraft can communicate with each other, e.g., through an infrared interface. The approach of the towing spacecraft can also be detected optically by the spacecraft to be towed. In principle, other variants can also be employed to effect detection of the approach.

The invention furthermore provides a spacecraft, in particular, a satellite that comprises a towing apparatus of the type identified above. A spacecraft according to the invention has the same advantages as those that have been described in connection with the towing apparatus according to the invention.

The invention furthermore provides a towing spacecraft, in particular, a towing satellite that comprises an attachment piece for mechanical attachment to a complementary attachment piece of a towing apparatus of the type identified above, which attachment piece is disposed on the second end of a cable.

In another advantageous embodiment, the towing spacecraft comprises detection means to detect the positioning aid of the attachment piece on the towing apparatus. For this purpose, the detection means of the towing spacecraft can include, for example, a camera or other sensors.

BRIEF DESCRIPTION OF THE DRAWING FIGURES

The following discussion describes the invention in more detail based on an exemplary embodiment in the drawing.

The single FIGURE provides a schematic illustration of a towing apparatus according to the invention disposed on a spacecraft that potentially must be towed, which in the event of a malfunction is towed and disposed of by a towing spacecraft.

DETAILED DESCRIPTION

In the FIGURE, reference numeral 1 identifies a towing apparatus according to the invention. Towing apparatus 1 is attached to a spacecraft that potentially must be towed 100 (hereafter identified as the "satellite"). Towing apparatus 1 constitutes a "towing aid" that facilitates the action of a towing spacecraft 200 (hereafter referred to as the "towing satellite") in connecting to defective satellite 100. In order to provide the benefit of the advantages of towing apparatus 1 according to the invention, towing apparatus 1 must be provided on every satellite 100 to be launched in the future.

Towing apparatus 1 comprises a cable 10, the first end 11 of which is attached on or in a cable receiver 15 of towing apparatus 1. A second free end 12 is designed to be at least temporarily connected to towing satellite 200 for the purpose of towing satellite 100. An attachment piece 13 for mechanical attachment to a complementary attachment piece 213 of towing satellite 200 is provided on the second end 12 of cable 10. To assist towing satellite 200 in detecting and capturing attachment piece 13, a positioning aid 14 is additionally disposed on the second end 12, the positioning aid enabling towing satellite 200 to detect attachment piece 13 in a simplified manner. Positioning aid 14 can include, for example, a reflector and/or a permanent magnet. Positioning aid 14 and attachment piece 13 do not have to be two different components, as is illustrated in the schematic FIGURE. Instead, attachment piece 13 can itself be designed to be reflective and/or permanently magnetic so as to facilitate the detection and capture of complementary attachment piece 213.

A malfunction in satellite 100 frequently causes this to undergo a tumbling motion that impedes the process of towing. For this reason, a mass is provided at the second free end 12 of cable 10 so as to increase the moment of inertia of defective satellite 100. This retards any tumbling motion and simplifies the capture, in particular, attachment of attachment piece 13 and complementary attachment piece 213. The mass can be provided in the form of an additional component on second end 12 of cable 10. The mass can also be provided by attachment piece 13 and/or positioning aid 14.

Cable receiver 15 stores the cable in space-saving area—as long as satellite 100 does not experience any malfunction. After receiving an actuation signal from a release device 16, cable receiver 15 extends cable 10 to be connected to complementary attachment piece 213 of towing satellite 200, thereby enabling spacecraft 100 to be towed. Release device 16 issues the actuation signal, for example, whenever the approach of towing spacecraft 200 has been detected and a malfunction is present in satellite 100 at the same time. To this end, towing apparatus 1 has a detection means 18 connected to release device 16, the detection means being designed to detect the approach of towing satellite 200. If the criterion for the approach of towing spacecraft 200 is found, detection means 18 supplies an actuation signal to release device 16, thereby initiating the actuation of cable receiver 15 to extend cable 10.

For example, detection means 18 can use optical sensors or radar to determine that a certain relative distance has fallen below a specified value. The approach of towing spacecraft 200 towards satellite 100 can also effected, for example, through a bidirectional communication exchange. In principle, virtually any communications interface can be employed here. Use of an infrared interface, in particular, can be considered as one possible approach.

After receiving the actuation signal from release device 16, towing apparatus 1 is released, i.e., cable receiver 15 extends cable 10 contained in the receiver. Towing apparatus 1 preferably has an independent power supply 17—for example, a separate solar cell—so as to be able to ensure that cable 10 extends even in the event that the power supply of satellite 100 malfunctions. This supplies at least detection means 18 with electrical power. If release device 16 is operated electrically, independent power supply 17 also takes on the function of supplying power to it. In addition, release device 16 or cable receiver 15 can have a mechanical drive mechanism, for example, a spring-loaded means that enables cable 10 to be extended by the force of a spring. This aspect allows redundancy to be provided that ensures the intended functionality of towing apparatus 1. In the event that the power supply of towing apparatus 1 fails, the cable can be extended automatically, e.g., by the force of a spring. This ensures that the docking point for towing satellite 200 is always available.

Cable 10 is of a length measuring 5 to 25 m, in particular, 8 to 12 m, and especially preferably, around 10 m. This ensures that there is sufficient distance between towing satellite 200 and satellite to be towed 100 during a towing operation. As a result, collisions can be avoided.

Complementary attachment piece 213 of towing satellite 200 is mounted, for example, on a gripper arm 210 of towing satellite 200. The movement of this arm can be controlled to enable it to perform the action of gripping attachment piece 13. Arm 210 here can have a plurality of articulated joints to ensure maximum mobility for complementary attachment piece 213.

In addition, towing satellite 200 has a detection means 214 to detect positioning aid 14 of attachment piece 13 of towing apparatus 1. Detection means 214 can be operated using optical or RF detection means or other sensor systems.

Attachment piece 13 (and thus complementary attachment piece 213) are preferably designed as standardized adapters so as to enable towing satellite 200 to effect towing and to allow for disposing of the greatest number of (defective) satellites 100. This approach provides a simplified connection process, thus enabling a towing satellite to perform multiple missions.

The additional provision of a positioning aid that is preferably designed in combination with a mass, which reduces the tumbling motion of satellite to be towed, allows for significantly more cost-effective implementation of the towing satellite as compared with more complex gripping systems since this facilitates gripping and attaching the two attachment pieces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST 1 towing apparatus
10 cable
11 first end
12 second end
13 attachment piece
14 positioning aid
15 cable receiver
16 release device
17 power supply
18 detection means
19 mass
100 satellite
200 towing spacecraft
210 arm
213 complementary attachment piece
214 detection means

What is claimed is:

1. A towing apparatus for a spacecraft that may be potentially towed when in orbit, the towing apparatus comprising:
    a cable, the first end of which is permanently connected to the spacecraft, and the second end of which is at least temporarily connectable to a towing spacecraft for the purpose of towing;
    an attachment piece disposed on the second end of the cable, the attachment piece is mechanically attachable to a complementary attachment piece of the towing spacecraft;
    a positioning aid disposed on the cable to allow for detection of the attachment piece by the towing spacecraft;
    a cable receiver that stores the cable; and
    a release device configured to issue an actuation signal to the cable receiver when both:
        (i) an approach of the towing spacecraft is detected and
        (ii) a malfunction of the spacecraft containing the towing apparatus is detected,
    wherein the cable receiver is configured to extend the cable for attachment to the complementary attachment piece of the towing spacecraft in order to tow the spacecraft containing the towing apparatus.

2. The towing apparatus according to claim 1, wherein a mass is disposed on the second end of the cable, the mass being constituted in such a way as to reduce the tumbling motion of the cable or of the satellite.

3. The towing apparatus according to claim 2, wherein the mass is provided by the attachment piece or the positioning aid.

4. The towing apparatus according to claim 1, wherein the cable is of a length measuring from 5 to 25 m.

5. The towing apparatus according to claim 4, wherein the cable is of a length measuring from 8 to 12 m.

6. The towing apparatus according to claim 5, wherein the cable is of a length of 10 m.

7. The towing apparatus according to claim 1, wherein the attachment piece is a standardized adapter.

8. The towing apparatus according to claim 1, wherein the positioning aid includes a reflector or a permanent magnet.

9. The towing apparatus according to claim 1, wherein the release device is electrically operated.

10. The towing apparatus according to claim 9, wherein the release device has an independent power supply.

11. The towing apparatus according to claim 10, wherein the independent power supply is a solar cell.

12. The towing apparatus according to claim 1, wherein the release device is able to be operated mechanically.

13. The towing apparatus according to claim 1, further comprising:
    detection means connected to the release device, the detection means detecting the approach of a towing spacecraft and supplies the release device with the actuation signal when a certain relative distance falls below a specified value so as to initiate the extending of the cable.

14. A spacecraft, comprising:
    a towing apparatus, the towing apparatus comprising a cable, the first end of which is permanently connected to the spacecraft, and the second end of which is at least temporarily connectable to a towing spacecraft for the purpose of towing;

an attachment piece disposed on the second end of the cable, the attachment piece is mechanically attachable to a complementary attachment piece of the towing spacecraft;

a positioning aid disposed on the cable to allow for detection of the attachment piece by the towing spacecraft;

a cable receiver that stores the cable; and a release device configured to issue an actuation signal to the cable receiver when both:
  (i) an approach of the towing spacecraft is detected and
  (ii) a malfunction of the spacecraft containing the towing apparatus is first detected, wherein the cable receiver is configured to extend the cable for attachment to the complementary attachment piece of the towing spacecraft in order to tow the spacecraft containing the towing apparatus.

15. The towing apparatus according to claim 14, further comprising:

detection means connected to the release device, the detection means detecting the approach of a towing spacecraft and supplies the release device with the actuation signal when a certain relative distance falls below a specified value so as to initiate the extending of the cable.

16. The towing apparatus according to claim 14, wherein the release device has an independent power supply that is a solar cell.

* * * * *